United States Patent [19]

Cochrane

[11] Patent Number: 5,749,201
[45] Date of Patent: May 12, 1998

[54] LASER BONDED TAMPER PROOF PRESS-ON CAP AND SEAL

[76] Inventor: Benjamin Cochrane, P. O. Box 835, Danville, Calif. 94526

[21] Appl. No.: 699,166

[22] Filed: Aug. 19, 1996

[51] Int. Cl.[6] ..................................................... B65B 3/00
[52] U.S. Cl. .............................. 53/281; 53/282; 430/945
[58] Field of Search .......................... 53/281, 282, 478, 53/485; 430/945

[56] References Cited

U.S. PATENT DOCUMENTS

| | | | |
|---|---|---|---|
| 4,632,265 | 12/1986 | Cochrane | 215/232 |
| 4,819,906 | 4/1989 | Cochrane | 249/67 |
| 4,951,830 | 8/1990 | Cochrane | 215/256 |
| 5,249,738 | 10/1993 | Werth | 53/398 |
| 5,452,565 | 9/1995 | Blom et al. | 53/510 |
| 5,588,286 | 12/1996 | Focke et al. | 53/234 |
| 5,641,004 | 6/1997 | Py | 53/403 |
| 5,661,113 | 8/1997 | Danyluk et al. | 53/527 |

Primary Examiner—James F. Coan
Assistant Examiner—Gene L. Kim
Attorney, Agent, or Firm—Robert E. Strauss

[57] ABSTRACT

There is disclosed a press-on cap having a flat top with a cylindrical skirt with an annular tear band defined by a pair of annular score lines, and with at least two annular inner beads which seat in annular grooves in the neck of a bottle. The cap skirt extends below the lower score line of the annular tear band to form a tamper-proof ring which is bonded by laser radiation at least one, preferably two, spots to the neck of the plastic bottle. The spot bonds preferably have a diameter no greater than about 0.15 inch. The invention also comprises a bottle filler line which includes a capping station in which caps are applied and pressed downwardly over the narrow necks of the bottles which have been filled with a liquid such as milk or non-carbonated beverage, and a cap bonding station in which the capped and filled bottles are passed between laser beam effectors which are pulsed momentarily to spot bond the tamper-proof rings of the caps to the necks of the bottles.

5 Claims, 4 Drawing Sheets

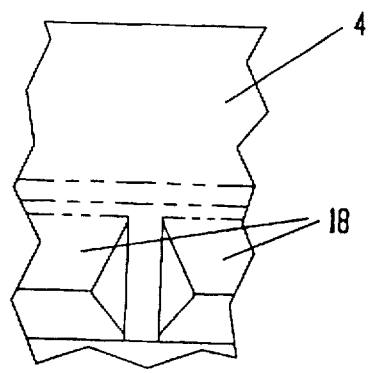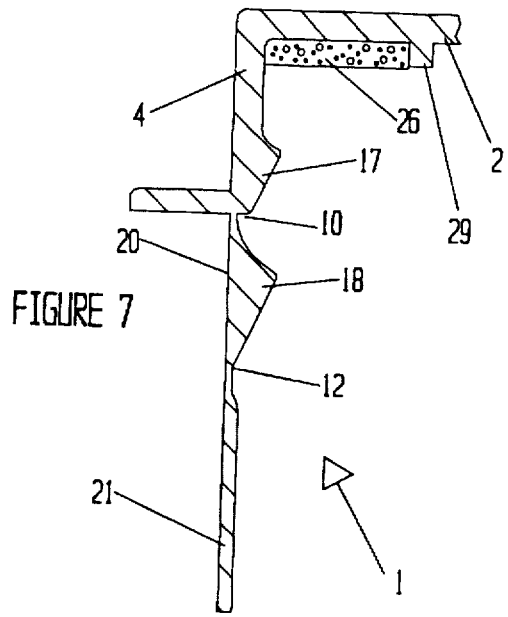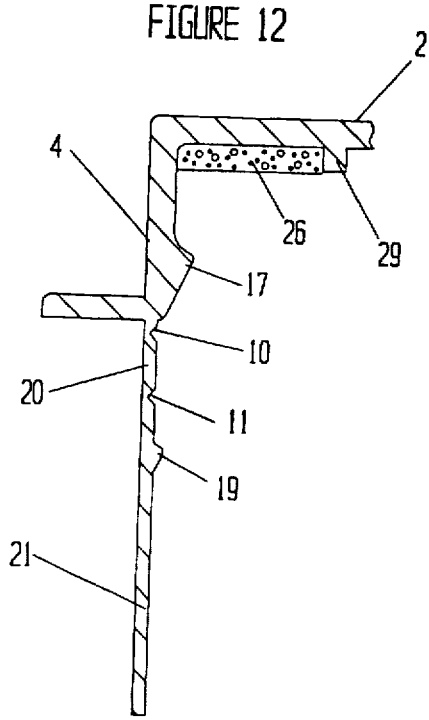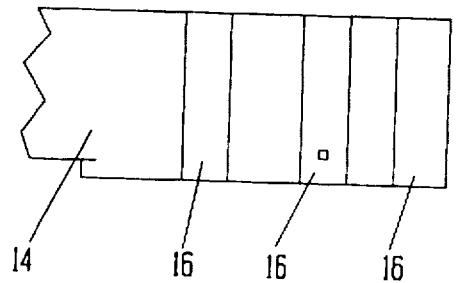

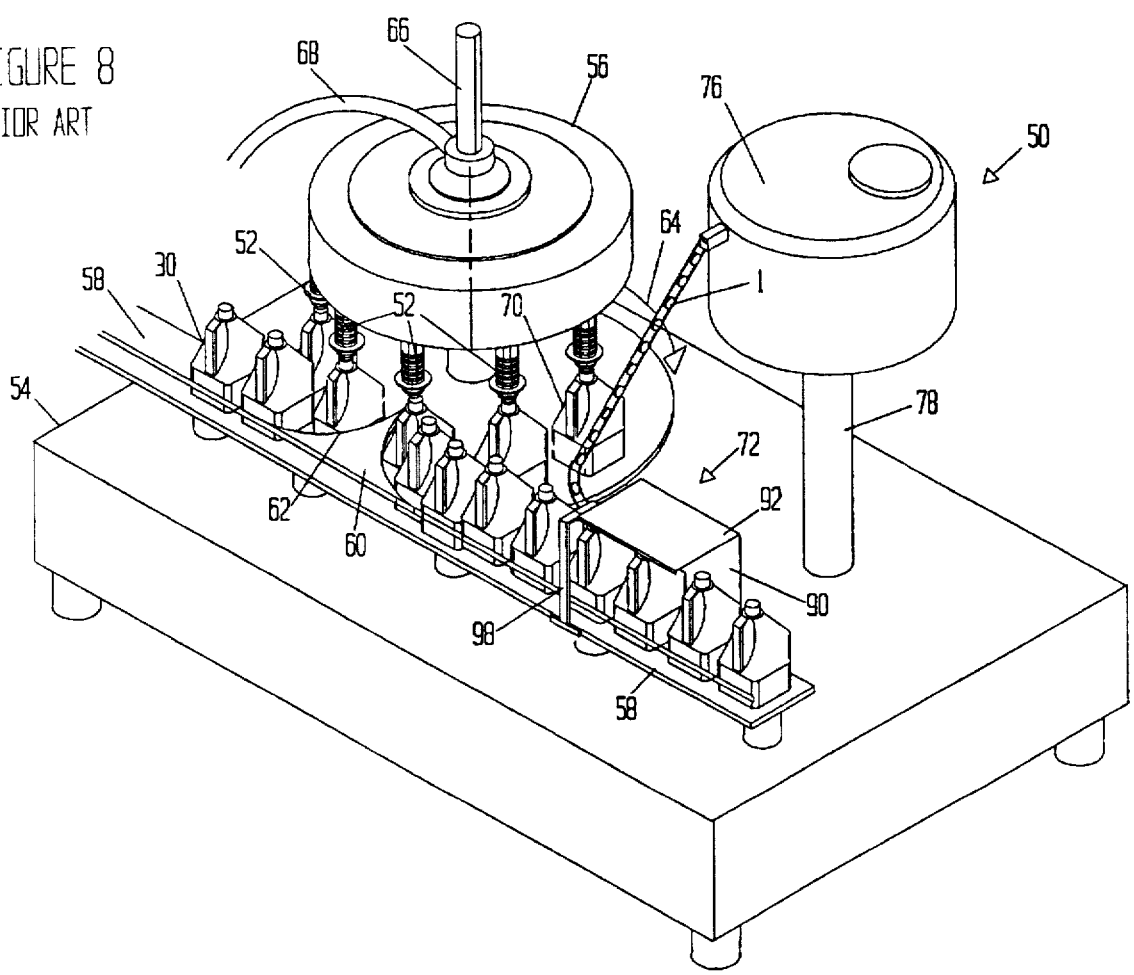

5,749,201

1

LASER BONDED TAMPER PROOF PRESS-ON CAP AND SEAL

BACKGROUND OF THE INVENTION

1. Field of the Invention

This invention relates to an improved tamper proof press-on cap and plastic container and method for bonding of the cap to its container and, in particular, to a cap and capping operation particularly suitable for non-carbonated beverages such as milk, water and fruit juices.

2. Brief Statement of the Prior Art

Plastic caps for narrow-necked bottles and containers such as the ubiquitous dairy plastic container are typically of press-on or screw type. These caps commonly have a flat top with a dependent cylindrical skirt which bears two annular ribs or beads about its inner periphery that are axially positioned to be received in annular grooves in the neck finish of the container. Two parallel lines are scored into the skirt, between the two annular beads to form a tear band which permits removal of the cap. The tear band construction and upper and lower annular beads has been claimed by some manufacturers as "tamper-proof". The tamper-proof objective, however, has not been achieved, as substantially all press-on caps can be removed without removing the tear bands, with varying difficulty, depending on the design. This shortcoming is inherent in the cap design and the operation for capping of the bottles, since the caps must be sufficiently elastic to stretch and permit the annular beads to seat in the annular grooves of the bottle neck during the capping operation. A simple application of a sufficient unseating force will remove the entire cap, which when reseated, offers no clue that the container was previously opened.

In my prior U.S. Pat. Nos. 4,632,265, 4,819,906 and 4,951,830, I disclose and claim a press-on cap narrow-necked bottles and containers which has an annular tear band that when removed, forms a reclosure cap. In some applications, I disclosed that the annular tear band can separate the cap into a reclosure cap and an annular band which remains on the bottle, and that this annular band can be ultrasonically welded or bonded to the bottle to prepare a tamper-proof cap. Although this cap design was thus readily adoptable to a tamper-proof capping of a bottle, acceptance of the tamper-proof features has been difficult, particularly because of the difficulties in ultrasonically bonding the lower portion of the cap skirt to the bottle in a commercial bottle filling and capping operation.

OBJECTIVES OF THE INVENTION

It is an objective of the invention to provide a tamper-proof closure on a container such as a bottle.

It is likewise an objective of this invention to provide a capping operation to prepare a tamper-proof sealing of a cap to a container.

It is an additional objective of this invention to provide a capping operation that achieves a tamper-proof bonding of a press-on cap to a narrow-necked bottle.

It is a further objective of this invention to apply a laser bonding technique to secure a press-on cap to a narrow-necked bottle in a tamper-proof construction.

Other and related objectives will be apparent from the following description of the invention.

BRIEF DESCRIPTION OF THE INVENTION

The invention uses a press-on cap having a flat top with a cylindrical skirt with an annular tear band defined by a pair

2 of annular score lines, and with at least two annular inner beads which seat in annular grooves in the neck of a bottle. The cap skirt extends below the lower score line of the annular tear band to form a tamper-proof ring which is bonded by laser radiation at least one, preferably two, spots to the neck of the plastic bottle. The spot bonds preferably have a diameter no greater than about 0.15 inch. The invention also comprises a capping operation in which the bottles which have been filled with a liquid such as milk or non-carbonated beverage are passed into a capping station in which the caps are applied and pressed downwardly over the narrow necks of the bottles, and then passed between laser sources which are pulsed momentarily to spot bond the tamper-proof rings of the caps to the necks of the bottles.

BRIEF DESCRIPTION OF THE DRAWINGS

The invention will be described with reference to the figures of which:

FIG. 5 is a view of the area between lines 5—5' of FIG. 4;

FIG. 6 is a view of the area between lines 5' and 6 of FIG. 4;

FIG. 7 is an enlarged sectional view of the profile of the preferred cap for use in the invention;

FIG. 8 illustrates a typical bottling and capping machine in which the invention is used;

FIG. 12 is a sectional view of an alternative cap.

DESCRIPTION OF PREFERRED EMBODIMENT

Figure 1:
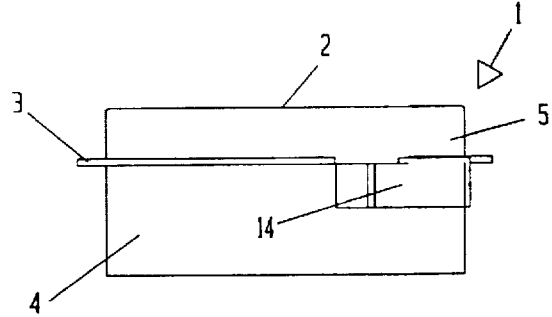
FIG. 1 is an elevational view of the cap used in the invention.
Figure 2:
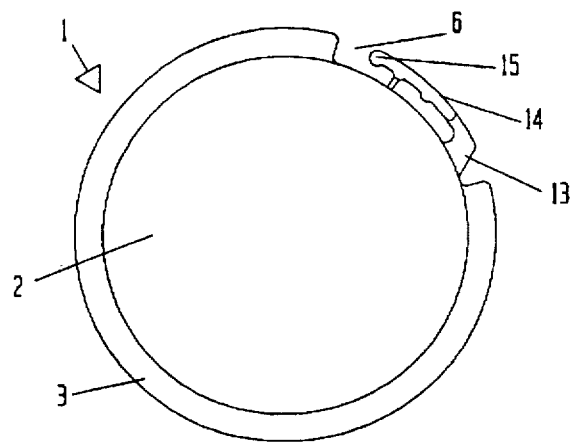
FIG. 2 is a view of the top surface of the cap used in the invention.

When references are made to the accompanying drawings the similar characters of reference represent corresponding parts in each of the several figures.

As shown in FIGS. 1–4, the cap 1 which I prefer for use in this invention is substantially the same as that shown in my previously identified patents. The cap is constructed from a resilient and moderately flexible plastic substance that will deform slightly to snap on and snap off a container. Exemplary plastic materials which may be employed include polyethylene, polystyrene, polyvinyl chloride, polyacrylates, polyamides, polypropylene, etc. The preferred plastics are polyethylene and polystyrene.

Cap 1 has three main structural elements, a top disk 2, a single downwardly dependent skirt 4, and a partial annular lip 3 about its upper portion 5. The top disk 2 is preferably a flat circular plate having a substantially planer exterior surface. The flat exterior surface provides a convenient place for labels or instructional material. While the disk can have a shape other than circular such as rectangular, oval, etc., the circular shape is preferred. The annular lip 3 extends beyond the skirt a slight distance to provide a convenient grasping tab for the removal of the upper portion 5 of the cap from the container once the tear band, described hereinafter, has been removed.

As illustrated, lip 3 is discontinuous in the area 6, immediately above tear tab 14. A greater portion of lip 3 can be omitted, if desired, provided a sufficient area is present to permit one to lift up on the cap with one's fingers or thumb. Thus, the consumer, after removing the tear band from the cap, can open the container by applying pressure upwardly on the lip 3 by a thumb or finger. This section will unseat the upper bead from the upper groove and allow the cap to slide off the container neck in the manner described hereinafter.

The tear tab 14 has a radial leg 13 which is integral with the skirt 4 and also integral with a lateral leg 14. Leg 13 is about the same height as the width of the tear band, i.e., the distance between upper score line 10 and lower score line 12. Preferably, the end of leg 14 is of slightly greater height (see FIG. 1) than leg 13, and extends up to the level of the annular lip 3.

Figure 3:
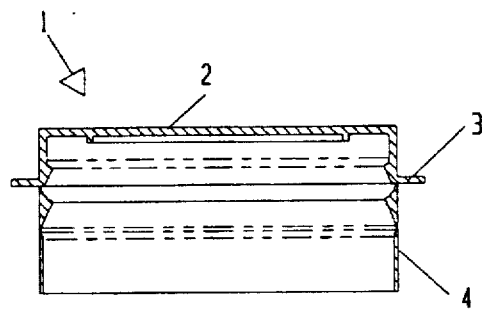
FIG. 3 is an elevational sectional view of the cap used in the invention.
Figure 4:
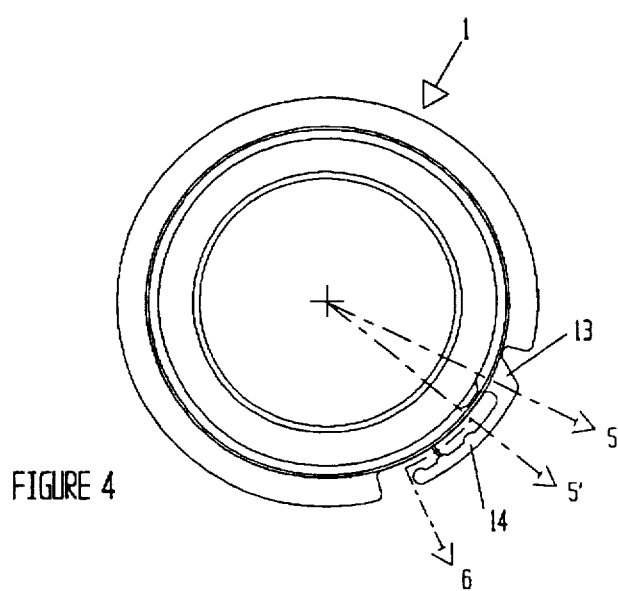
FIG. 4 is a view of the undersurface of the cap used in the invention.

Referring now to FIGS. 3, 4 and 7, the skirt 4 of cap 1 is integrally attached to the top disk 2 and extends substantially perpendicularly from the undersurface of the disk. The skirt 4 is a thin-walled cylindrical shell and is composed of the thin shell, an upper score line 10, a lower score line 12, tear tab 14 (see FIGS. 1 and 2), an upper circumferential bead 17 and a lower circumferential bead 18.

The thickness of the skirt is not critical to the practice of this invention as long as the cap is sufficiently resilient to allow the internal beads 17 and 18 to expand over the wide areas of the container neck and snap into the container grooves without tearing the cap or container. Generally, however, the skirt thickness is governed by economics with the thinnest walled functional cap being preferred. Usually, the skirt will have a thickness ranging from 0.3 to 1.5 millimeters and more usually from 0.5 to 1.2 millimeters.

The upper score line 10 and lower score line 12 extend circumferentially about the skirt 4 and have a depth which is approximately 0.15 to 0.5 the wall thickness of skirt 4. That portion of the skirt between score lines 10 and 12 constitutes tear band 20. This tear band is removed when the consumer opens the container and, after it is removed from the cap, it can be discarded. Since it is to be discarded, it is preferable to make the band as narrow as possible without weakening the band to a point where it could break during removal. Generally the tear band will range in width from 2 to 10 millimeters.

A lateral tear tab 14 is attached to tear band 20 to provide a means for the user to grasp the tear band and tear it from the cap. The tear tab 14 may be any laterally projecting tab which permits the consumer to easily grasp it. As shown in FIG. 5, the lower annular bead 18 on the inner wall of the skirt 4 is interrupted, i.e., is discontinuous immediately beneath the tear tab 14 (see FIG. 4), thereby forming a weakened sidewall which will permit the tear band to separate when the user pulls on the tear tab, which will continue to separate along its annular score lines, as previously mentioned. If desired, the inner annular bead 18 can be discontinuous in other locations, to permit facile seating of the cap during the capping operation.

The tab 14 is preferably of greater width than the band 20 for ease in grasping the tab and removing the tear band, and projects above the band 20 slightly. In order to increase the friction between the fingers and the tear tab, the tab can be provided with serrated grooves or the like. FIG. 6 illustrates the inside vertical wall of the tear tab 14. The tear tab 14 has a plurality of vertical ribs 16, seen also in FIG. 4, to facilitate grasping of the tear tab by the user.

FIG. 7 illustrates the sidewall profile of the cap of the invention. As there illustrated, the cap has an upper bead 17 and the lower bead 18, which extend circumferentially about the inner sidewall of the skirt 4 and these beads are separated by a score line 10. The skirt also has an annular score line 12 immediately beneath the lower internal bead, thereby defining an annular tear band 20 which can readily be separated from the cap 1. The lower portion of the skirt 4 forms a separable, tamper-proof ring 21 which, in this invention is bonded by laser beam radiation to the neck of the bottle, as described in greater detail hereinafter.

Received within the cap is a compressible gasket 26 which is formed of suitable compressible plastic such as polyethylene, polyurethane, polystyrene, etc. A suitable material is a thermoplastic hot meld having a high elasticity. Preferably, the undersurface of the cap top disc 2 has an annular rib 29 which defines an annular recess to receive the gasket 26, insuring that the gasket is in an annular area which will seal against the upper edge of the neck of the bottle closed with the cap 1.

An example of a commercially available material for gasket 26 is product S-314-434A from Bostik which has about 520 percent elongation at break point and a tensile strength of about 140 psi. This material can be applied in a foamed or unfoamed state. Other plastic foams can be used and are preferably of low density, e.g., about 0.5 to about 2 pounds per cubic foot. The gasket 26 is relatively thin, e.g., from about 0.1 to about 0.25 inch, preferably from about 0.1 to about 0.125 inch in thickness. The gasket is formed of plastics which are resistant to liquid permeation, and when used in a foamed state, the foams are formed of closed cells, and are, thus, impermeable to liquids.

The gasket 26 can be formed during the formation of the cap, and for this purpose, a polyolefin liquid resin, which cures to a polyolefin foam can be injected into the mold cavity as a preliminary step to the injection molding of the caps. Once the polyolefin foam is injected and the foam gasket 26 is formed, the injection molding of the cap proceeds with the formation of a cap having a firmly bonded gasket 26 on its undersurface. The gasket 26 can be subsequently formed or bonded to the undersurface of cap 26, either by bonding a preformed and precut gasket 26 or by applying the liquid plastic onto the previously formed cap. This is the preferred application with the hot melt gasket material previously described.

When the cap is seated on the container with its circumferential beads 17 and 18 received within the annular grooves bottle neck, the container neck compresses the gasket 26, thus insuring sealing of the contents of the container. The annular, raised rim 29 avoids the application of the gasket material across the entire undersurface of cap 1.

Referring now to FIG. 8, there is illustrated a typical commercial filler machine 50. The particular machine is Federal Filler Model PLG 181 which is arranged for straight-line capping. The machine has a total of 18 filler valves 52 with a rated output of 55 gallons per minute. Typical fillers with commercial dairy bottling equipment fill one-gallon milk bottles and cap the bottles at bottle rates of 50 to 110 bottles per minute, and half gallon bottles at speeds of about 130 bottles per minute. In the juice industry, which uses bottles of 12 to 16 ounce capacities, the bottles are filled and capped at rates of about 200 bottles per minute.

The filler machine 50 is simplified for purposes of illustration. It has a base 54 within which are housed the mechanical drive and control components for the machine. The filler valves 52 are mounted on a rotary carousel within filler housing 56 which is supported by a pedestal above the base 54. Typically a total of from 18 to 26 filler valves are used and extend from the undersurface of the carousel, above a table on which the bottles 30 are placed by the bottle conveyor 58. The conveyor 58 has a deflector plate 60 with a curved rib 62 that directs the empty bottles 30 onto the table and beneath a filler valve 52 of the carousel. The bottles 30 are moved around the table by a star wheel (not shown) and a cam mechanism lifts each bottle until the open neck of the bottle is in a sealed engagement with a filler valve 52.

The bottles 30 are moved about the table in the direction of the arrowhead line 64. As the bottle 30 and carousel rotate, the controls of the filler machine fill the bottle by metering a measured quantity of liquid, e.g., milk into each bottle. The liquid is received thorough the supply line 66, while the air displaced from the bottle is removed through a vacuum line 68.

The filled bottles 70 are discharged from the filling pedestal table by the deflector plate 60 and directed onto the conveyor 58 which moves the filled bottles 70 in single file towards the capping station 72. As the bottles 70 enter the capping station, they pass beneath the cap chute 74 from which a cap 1 is picked off by the neck of the bottle 70; see also FIG. 9. The caps 1 are loaded into a cap hopper 76 which is supported by a cap pedestal 78 from which they are removed and passed into the cap chute 74 by a mechanism within the cap hopper 76.

The bottles 70 are passed beneath a capping plate 80 (see FIG. 9) and a cam raises each bottle to press the cap 1 against the capping plate 80 and seat the cap onto the bottle neck. The capping station is partly surrounded by back plate 90 and cover plate 92. The filled and capped bottles 70 exit from the filler machine 50 on the conveyor 58 which discharges to an additional conveyor (not shown) that passes the bottles to a packaging station (not shown).

The filler machine is a highly compact machine with little or no space to accommodate any machinery to bond the caps to the bottles. Any equipment to bond the caps to the bottles must be capable of integration into the bottle line of the filler machine and capable of operation at the bottling speeds previously mentioned.

Figure 9:
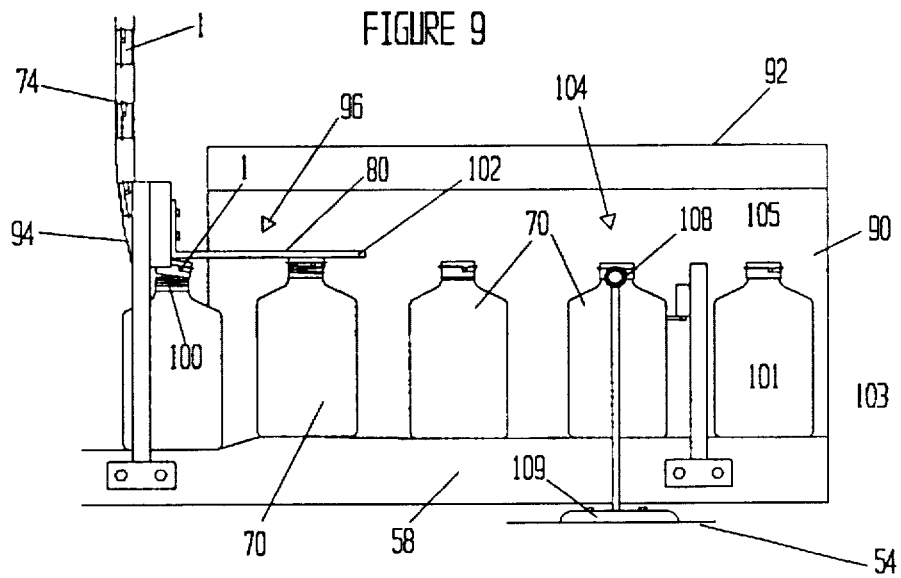
FIGS. 9 and 10 illustrate the installation of the laser sealing apparatus in the bottling and capping machine shown in FIG. 8.
Figure 10:
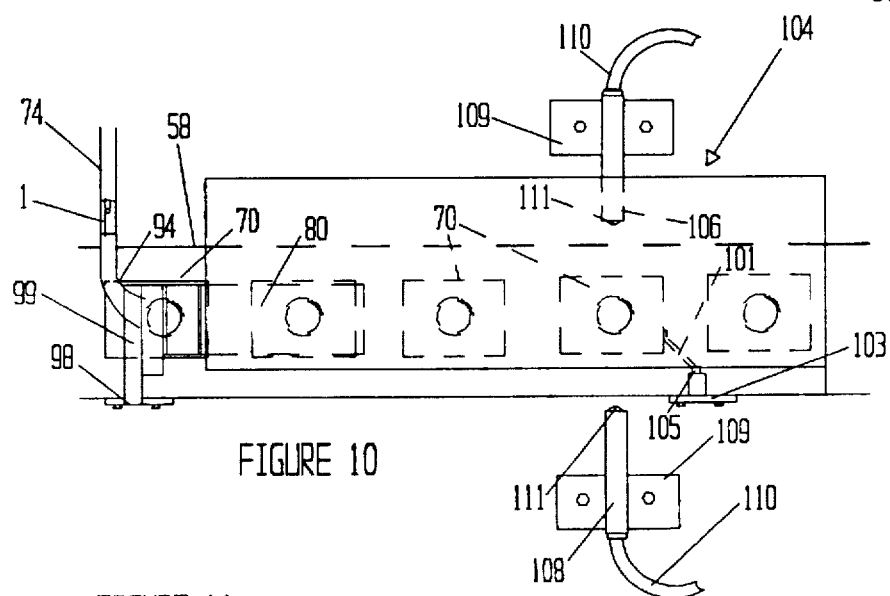

Referring now to FIGS. 9 and 10, the capping station is shown in elevational and plan view. The filled bottles 70 are passed on the conveyor 58 in a single-file beneath the lower end 94 of the cap chute 74. The lower end 94 of the cap chute supports an angle plate 96 and the entire assembly is rigidly supported by post 98 which is fixedly secured to the frame of the filler 50. As previously mentioned, the cap 1 at the lower end of the chute is picked off by the neck 100 of the bottle 70 and moves with the bottle 70 beneath the capping plate 80 on the horizontal arm 102 of angle plate 96, where it is pressed securely onto the bottle neck 100, seating the inner annular beads 17 and 18 (see FIG. 7) into mating grooves of the necks 100 of the bottles 70 and compressing the upper ends of the bottle necks 100 against the sealing gaskets 26 (see FIG. 7) on the undersurface of the caps.

As the capped bottles 70 exit the capping plate 80, they pass through the laser bonding station 104 of this invention, where a pair of laser beam end effectors 106 and 108 are located. The effectors are supported on a stand which can be permanently affixed to the filler base 54. The effectors include a fiber optic light tube 107 which receives a laser beam through fiber optic cables 110 (see FIG. 10) and a terminal focusing element, typically a lens 109, to focus the beam on the tamper-proof rings 21 of the caps located at the lower portions of the skirts 4 of the caps, below the tear bands 20. The laser beams are pulsed on and off to the laser beam generators at a timed rate to correspond to the transport rate of the capped and filled bottles 70. Preferably, a bottle position sensor is also used to detect when a bottle 70 moves into the target position between the laser beam effectors 106 and 108. Various sensors can be used, the simplest being a hinged lever arm 101 which is supported by a bracket 103 to the conveyor 58 and which extends over the conveyor 58 so that it will be deflected when the leading edge of a bottle 71 moves into contact with the arm. The arm is coupled to a micro switch 105 that coordinates the timed pulsing of the laser beam to each of the end effectors 106 and 108 with the positions of the filled and capped bottles 70 on the conveyor 58. Alternatively, photo sensors can be used including more sophisticated optical interferometers which detect light beams reflected from the bottle cap when it is in the target position.

Figure 11:
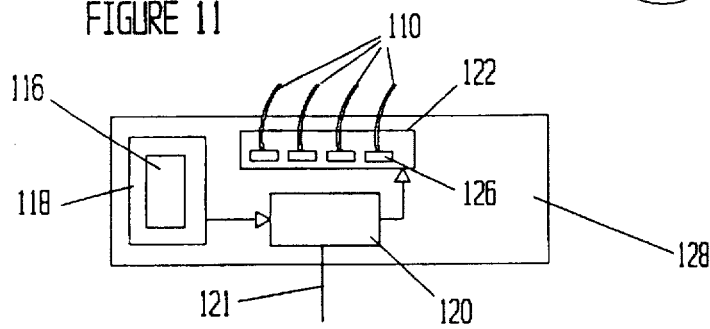
FIG. 11 is a block diagram of a typical laser system useful in the invention.

Preferably a multiple kilowatt CW Nd:YAG laser beam system is used to form a laser beam that is delivered to the fiber optic cable. The system, shown in block form in FIG. 11, includes a power supply 116, a surrounding cooling system 118, controls 120 with an input connection 121 from the microswitch 105 or other bottle position sensor, and a multiplexer 124 to generate a laser beam and direct the laser beam intermittently to one of a plurality of fiber optic cables 110. Each fiber optic cable 110 is secured to a laser head 126 and has its opposite end secured to a respective end effector. The laser beam generator is housed in a cabinet 128 which typically is five feet in height and about six feet long, and the cabinet can be positioned at a remote location some distance from the filler machine 50 and the flexible fiber optic cables 110 can be extended from the remote location to the end effectors 106 and 108 which are, preferably, mounted on opposite sides of the bottle conveyor 58. A suitable laser system for this application is available from Hobart Lasers & Advanced Systems, Troy, Ohio under the model designation of Hobart HLP 750. This system has a multiplexer which will supply pulsed laser energy to four laser end effectors, thereby permitting a single system to be used on more than a single filler line. Each laser beam is pulsed momentarily when a bottle 70 reaches a position directly between the laser beam end effectors 104 and 106. The laser beams form spot-welds between the tamper-proof rings 21 and the necks 100 of the bottle. The size of the spot welds is from 600 microns to about 5 millimeters in diameter. Despite the small size of the spot welds, the resultant bond between the cap and bottle is sufficient to prevent removal of the cap unless the tear band is separated from the cap.

Another embodiment of the cap is shown in FIG. 12, in which the tamper proof bead 19 is located on the tamper proof ring 21, beneath the tear band 20. In this embodiment, the bead 19 can be used independently of the laser bonding step. In some applications, the bead 19 is sufficient to prevent removal of the cap. In sensitive applications, the combination of laser bonding and the tamper proof bead 19 provides additional assurance against tampering in the event, for whatever reason, there should occur an interruption of the laser beam bonding operation while the filler line is in operation.

The entire bonding step with laser welding occurs in a fraction of a second and the bottle-filling and capping operations is not slowed to any degree by the laser bonding. Further, the necessary equipment can be readily integrated with the highly compact and complex filler machines used in the dairy and fruit drink industries.

It has been found that laser beams generators with capacities from 200 to 600 watts can be used with the end effectors placed, preferably in pairs at 180° angular spacings, on opposite sides of the container conveyer of the bottling operation immediately following the press-on capping step and will function without failures at the aforementioned bottle filling rates. This contrasts sharply with ultrasonic bonding operations in which an annular ultrasonic generator ring must be placed over the cap and bottle neck, surrounding the lower peripheral ring of the cap. In such applications, the ultrasonic bonding equipment requires extension of the bottle conveyor to accommodate the necessary equipment, and reduces the speed of the bottle filling and capping operations to the point where it has not been accepted by the industry.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a bottling line having a filling station for filling plastic bottles with comestible liquids, each of the bottles having an open neck at its upper end with a neck finish including a plurality of grooves extending circumferentially about the neck, said bottling line including a capping station for capping the filled bottles with press-on plastic caps, each cap having a top disc and a downwardly dependent skirt with sealing beads on the inner wall of said skirt to seat into said bottle neck finish grooves, said bottling line including a bottle conveyor for transporting empty plastic bottles to said bottle filling station, with the bottle filling station having an automated bottle filler with a plurality of filler valves with means to move the valves into registration with the open necks of respective bottles delivered by the conveyor and including filler controls for metering a measured quantity of said comestible liquid into the bottle and including a filled bottle conveyor to received filled bottles from said filler station and transport the filled bottles in single file to said capping station, with the capping station including a cap conveyor to deliver, place and secure a single cap on each of the filled bottles during their transport on said filled bottle conveyor, the improvement comprising:

a. said press-on plastic bottle caps each having an annular tear band defined by a pair of spaced apart circumferential grooves about said skirt to permit the user to separate the cap into a top reclosure cap and a bottom tamper proof ring, and at least two sealing beads extending circumferentially about the internal wall of said skirt, at least one of which is located above said tear band;

b. a cap to bottle bonding station incorporated into said bottling line following said capping station and including:
1. at least two laser beam end effectors comprising an internally reflecting light tube terminating in a laser beam focusing element which are spaced at opposite sides of said filled bottle conveyor and are positioned to discharge a focused laser beam on said tamper proof ring of each of said plastic caps when the respective filled and capped bottle is at a target location between said effectors, during the transport of the filled and capped bottles on said filled bottle conveyor; and
2. a laser beam generator and controller including a power supply, controller and multiplexer with multiple fiber optic beam delivery cables extending from said generator and controller to each of said laser beam end effectors to apply at least two laser-welded spots at a circumferentially spaced-apart angular increment about said tamper proof ring to bond said ring to said neck of said plastic bottle.

2. The improvement in said bottling line of claim 1 which also includes a filled and capped bottle sensor to detect the position of filled and capped bottles relative to said laser beam during their transport on said filled bottle conveyor and control means responsive thereto to direct laser beam energy from said end effectors when a filled and capped bottle is positioned at the target location between said effectors.

3. The improvement in said bottling line of claim 1 wherein said laser beam end effectors are positioned at a 180-degree angular increment.

4. The improvement in said bottling line of claim 1 wherein said laser beam end effectors are focused and positioned to apply laser welded spots having generally cylindrical areas with diameters no greater than about 0.15 inch.

5. The improvement in said bottling line of claim 1 wherein said press-on cap also includes at least one sealing beam about the inner wall of its skirt extending circumferentially about said tamper proof ring.

* * * * *